United States Patent [19]

Kaiser

[11] Patent Number: 4,759,855
[45] Date of Patent: Jul. 26, 1988

[54] METHOD FOR DETACKIFICATION OF PAINT SPRAY OPERATION WASTES

[75] Inventor: Herbert J. Kaiser, St. Louis, Mo.

[73] Assignee: Calgon Corporation, Pittsburgh, Pa.

[21] Appl. No.: 77,524

[22] Filed: Jul. 24, 1987

[51] Int. Cl.$^4$ .............................. C02F 1/52
[52] U.S. Cl. ........................... 210/712; 55/85; 55/89; 210/717; 210/724
[58] Field of Search .............. 55/19, 84, 85, 89; 134/38; 210/702, 712, 723–728, 734, 735, 716, 717; 427/331

[56] References Cited

U.S. PATENT DOCUMENTS

| | | | |
|---|---|---|---|
| 3,404,088 | 10/1968 | Dujardin | 210/728 |
| 3,861,887 | 1/1975 | Forney | 55/85 |
| 3,990,986 | 11/1976 | Gabel et al. | 252/181 |
| 4,002,490 | 1/1977 | Michalski et al. | 55/84 |
| 4,005,009 | 1/1977 | Kinoshita et al. | 210/912 |
| 4,055,495 | 10/1977 | Gabel et al. | 210/736 |
| 4,067,806 | 1/1978 | Mauceri | 210/728 |
| 4,130,674 | 12/1978 | Roberts et al. | 252/181 |
| 4,600,513 | 7/1986 | Mizutani et al. | 210/712 |
| 4,686,047 | 8/1987 | Arots | 210/712 |

FOREIGN PATENT DOCUMENTS 55-22377  2/1980  Japan .................. 210/712

Primary Examiner—Peter Hruskoci
Attorney, Agent, or Firm—W. C. Mitchell; M. C. Sudol, Jr.

[57] ABSTRACT

An improved method for detackifying over-sprayed paint, lacquer or enamel entrained in the circulating water of paint spray booths comprises maintaining in the wash water a small amount of an alkaline zinc solution containing ammonium hydroxide and ammonium chloride.

3 Claims, No Drawings

METHOD FOR DETACKIFICATION OF PAINT SPRAY OPERATION WASTES

BACKGROUND OF THE INVENTION

Automobile parts, bicycles, toys, appliances and other industrial and consumer articles are conventionally spray painted in areas called spray booths wherein water curtains are employed to wash the air and to remove over-sprayed paint, lacquer or enamel solids. The wash water is then treated to remove paint solids, and the treated water is recirculated.

A water curtain is typically created by pumping water into a trough above the overspray area. The overflow from the trough is then controlled so that a uniform sheet of water falls along the length of the trough and down the booth's wall. Spray nozzles are also commonly used. Droplets of oversprayed paint, emitted by a spray gun, contact and are captured by the water curtain.

A major problem associated with spraying operations concerns the tacky or adhesive nature of the over-sprayed coating materials. Solids tend to agglomerate and accumulate on the walls, ceiling and floor of the spray area and to clog water spray equipment, recirculating pumps and the like. Thus, the overspray, or paint mist, captured in the water system of a spray booth must be detackified, or "killed", before it adheres to the walls, piping, etc. of the spray booth. Paint that sticks to spray booth surfaces usually cannot be easily removed from the equipment and tends to build up overtime, which hampers spray booth efficacy.

The term "paint killing", as used herein, refers to the act of detackifying oversprayed paint in paint spray booths.

"Paint", as used herein, is a generic term which encompasses all common varieties of water insoluble coatings commonly applied in spraying operations, including but not limited to oil base paints, enamels and lacquers. These products, if untreated, readily adhere to the walls of spray booths and any other surface that they contact, such as the surfaces of water distribution piping, spray nozzles etc.

One solution which has been found to have practical application to the problem involves the use of chemicals which, when added to spray booth water, detackify paint solids. A wide, variety of chemicals have been proposed for this purpose, including compositions containing polymers and multi-valent metal salts which form insoluble hydroxides at pH's greater than about 7. The use of combinations of this type are described in U.S. Pat. Nos. 3,861,887 to Forney; 3,990,986 to Gabel et al; 4,002,490 to Michalski et al; 4,130,674 to Roberts et al; and 4,440,647 to Puchalski. While these compositions are generally effective in detackifying and removing paint over-spray, a need exits for water-based, stable alkaline compositions which have high efficiency in order to increase productivity and to achieve a high degree of effectiveness for all types of paints and particularly solvent-borne paints, lacquers and enamels.

DETAILED DESCRIPTION OF THE INVENTION

The instant invention relates to the use of stable, alkaline/zinc solutions as detackifiers of water-borne paints. The effectiveness of these compositions depends on the ability of zinc to precipitate as zinc hydroxide upon dilution by the system being treated and alkalinity to "kill" entrained paints.

More particularly, the present invention relates to an improved method for detackifying over-sprayed paint entrained in the circulating water of water wash paint spray booths. The improvement comprises adding to the water being circulated in a paint spray booth operation an effective amount, for the purpose of detackifying and removing over-sprayed paint, a stable, alkaline zinc solution which comprises a zinc salt, ammonium hydroxide, ammonium chloride and water, and which precipitates zinc hydroxide when diluted by the wash water. The zinc hydroxide absorbs paint particles and then floats them to the surface of the system being treated, while the alkalinity detackifies the paint.

Thus, the instant invention additionally relates to paint-detackifying compositions comprising a zinc salt, ammonium hydroxide, ammonium chloride and water.

Any zinc source can be used. The preferred zinc sources are salts such as zinc chloride, and zinc oxide. To formulate the instant products, which are aqueous solutions, the zinc source is added to water so as to comprise 0.1 to 25% of the total composition weight, preferably 0.5–10%. Ammonium chloride and ammonium hydroxide are then added. The ammonium chloride should comprise 1–10% of the total composition weight and the ammonium hydroxide should comprise 1–20% of the total composition weight, preferably 1–5% and 1–10%, respectively. Order of addition of the zinc salt, ammonium chloride and ammonium hydroxide is not critical.

The ammonium ions solubilize the zinc in the concentrated alkaline solutions of the instant invention.

Additionally the ammonium chloride and ammonium hydroxide raise the pH of the zinc solution from about 7 to about 8.5 to 10.5, preferably 9.0–10.0. Even though the composition is strongly alkaline, the zinc remains in solution. The compositions are thus applied at a high pH, in a stabilized form.

Use of the instant solutions as detackifiers for paint spray operation waters is typically carried out by adding the stable, high pH aqueous zinc solution to fresh or recirculated water at a convenient location in the system being treated, such as at a sump, upstream from the pumps or at any advantageous location in the recirculation system, but preferably before the water enters the spray area circuit of the system being treated. Addition of the instant compositions to the system being treated dilutes the ammonium ion concentration, and precipitation of zinc hydroxide immediately occurs. The zinc hydroxide absorbs paint particles and floats them to the surface, while the alkalinity detackifies the paint. This facilitates easy removal of the paint/zinc hydroxide complex and recirculation of the wash water.

An effective amount of the instant composition should be added to the spray boothe water system. As used herein, the term "effective amount" is that amount which is sufficient to absorb all captured paint and to detackify the paint solids so that they can be readily separated from the wash water. Since the amount of paint contacting a water curtain varies depending on a number of variables, including plant or process shut-downs, the size of the items being painted, spraying techniques, waterflow rate and the type of paint being used, the amount of paint that is captured can vary considerably. Under normal conditions the dosage level is within the range of 0.1 to 5 oz/gal of water circulated, preferably 0.5 to 2.0 oz/gal of water circulated.

As indicated above, this invention does not require the presence of polymers or other additives to achieve high performance and efficiency. Such additives, however, have not been found to detract from the advantages realized by this invention and may under exceptional conditions provide marginal improvement with certain custom spray formulations. Typical water-soluble polymers of this type include the water-soluble cationic polymers such as quaternary ammonium polymers, which tend to coagulate small paint particles. A preferred polymer is a dimethyl diallyl ammonium chloride polymer. Other preferred additives include carbonates and phosphates, which add alkalinity to the system being treated and N-methylpyrrolidone, which assists in coupling the paint solids to the zinc floc.

Other additives which can be present in amounts up to about 5%, by weight, include clays, particularly bentonite, carbon black, talc, gums, starch, dextrin, lime, aluminum oxide, silica solids, casein and the like.

EXAMPLES

The following examples demonstrate the instant invention in greater detail. They are not intended, however, to limit the scope of this invention in any way.

The following products were formulated and used in the paint-kill examples:

| Ingredient | Active Weight % in Formula | | | | | |
|---|---|---|---|---|---|---|
| | A | B | C | D | E | F |
| Zeolite Softened Water | 65.0 | 56.7 | 56.5 | 57.8 | 59.85 | 58.6 |
| Zinc Chloride | 5.0 | 4.5 | 2.3 | 4.5 | — | — |
| Zinc Oxide | — | — | — | 22.5 | 2.7 | 3.0 |
| M—Pryol | 15.0 | 13.6 | 13.6 | 6.5 | 13.6 | 13.6 |
| Ammonium Chloride | 5.0 | 4.6 | 4.6 | 1.9 | 4.6 | 4.6 |
| Ammonium Hydroxide (28%) | 10.0 | 10.0 | 12.0 | — | 10.0 | 10.0 |
| Polydimethyl diallyl ammonium chloride* | — | 4.6 | 4.0 | 1.5 | 4.5 | 3.5 |
| Sodium Carbonate | — | 6.0 | 7.0 | 0.25 | 4.75 | 4.7 |
| Potassium Tripolyphosphate | — | — | — | 0.9 | — | 1.0 |
| Copper Nitrate | — | — | — | 1.5 | — | 1.0 |

*MW = approximately 500,000, available from Calgon Corporation as CatFloc C.

The above formulations were prepared by mixing the appropriate amounts of ingredients in the order given. These formulations were then added to beakers containing 200 ml of water at a dosage of 1.0 oz/gallon of water. 1 ml of a green, high solids commercially available enamel paint was then added to each beaker, and the contents were mixed. Kill performance was then measured subjectively by feel.

Results of these tests are shown in Table I.

TABLE 1

| EXAMPLE NUMBER | FORMULA | KILL PERFORMANCE |
|---|---|---|
| 1 | A | Good (slight tackiness, no paint remained on hand) |
| 2 | B | Good (slight tackiness, no paint remained on hand) |
| 3 | C | Fair (slight tackiness, some paint remained on hand, but was easily removed by wiping) |
| 4 | D | Good (slight tackiness, no paint remained on hand) |
| 5 | E | Excellent (no tackiness) |
| 6 | F | Excellent (no tackiness) |

What is claimed is:

1. A method for detackifying over-sprayed paint which contacts and is captured by water circulating in a paint spray booth operation, which comprises:
   (a) adding to said circulating water an effective amount of an alkaline zinc solution consisting essentially of 0.1 to 25%, by weight, a zinc source selected from the group consisting of zinc chloride and zinc oxide, 1 to 20%, by weight, ammonium hydroxide, 1 to 10%, by weight, ammonium chloride, and the balance water, thereby precipitating zinc hydroxide;
   (b) allowing said precipitated zinc hydroxide to absorb paint particles, thereby forming paint/zinc hydroxide complexes; and
   (c) separating said paint/zinc hydroxide complexes from said circulating water.

2. The method of claim 1, wherein said effective amount is 0.1 to 5 oz/gal of circulating water.

3. The method of claim 1, wherein said effective amount is 0.5 to 2 oz/gal of circulating water.

* * * * *